United States Patent [19]

Nakao et al.

[11] Patent Number: 5,458,226
[45] Date of Patent: Oct. 17, 1995

[54] ROTATABLE APPARATUS FOR TRANSFORMER CORE PLATES

[75] Inventors: Kiyoshi Nakao; Isao Suzuki, both of Kawasaki, Japan

[73] Assignee: Fuji Electric Co., Ltd., Kanagawa, Japan

[21] Appl. No.: 194,451

[22] Filed: Feb. 9, 1994

Related U.S. Application Data

[63] Continuation of Ser. No. 154,026, Nov. 18, 1993, abandoned.

[30] Foreign Application Priority Data

Nov. 19, 1992 [JP] Japan ................................ 4-309107

[51] Int. Cl.⁶ ........................................... B65G 47/24
[52] U.S. Cl. ..................... 198/379; 198/346.2; 271/185
[58] Field of Search ................................. 198/379, 411, 198/413–415, 346.2; 271/185

[56] References Cited

U.S. PATENT DOCUMENTS

| | | | |
|---|---|---|---|
| 3,496,051 | 2/1970 | Biklen | 156/584 |
| 3,540,568 | 11/1970 | Wellauer | 198/411 |
| 4,457,419 | 7/1984 | Ogami et al. | 198/414 |
| 4,533,033 | 8/1985 | Van Wegen | 198/413 |
| 4,803,882 | 2/1989 | Schonfeld et al. | 198/346.2 |
| 5,293,984 | 3/1994 | Lucas | 198/414 |

FOREIGN PATENT DOCUMENTS

| | | |
|---|---|---|
| 0546424A1 | 6/1993 | European Pat. Off. . |
| 1818988 | 9/1960 | Germany . |
| 405425 | 9/1960 | Germany . |
| 1917778 | 6/1965 | Germany . |
| 2101706 | 7/1971 | Germany . |
| 2163700B2 | 7/1973 | Germany . |
| 2654824 | 5/1978 | Germany . |
| 2908343A1 | 9/1980 | Germany . |
| 3125895A1 | 5/1982 | Germany . |
| 8706809U1 | 8/1987 | Germany . |
| 9318578U1 | 3/1994 | Germany . |
| 1582216A1 | 7/1990 | U.S.S.R. . |

*Primary Examiner*—Joseph E. Valenza
*Attorney, Agent, or Firm*—Finnegan, Henderson, Farabow, Garrett & Dunner

[57] ABSTRACT

A rotating apparatus for orienting transformer core plates during feed to a laminating station by a conveyer. The apparatus includes a plurality of level guides disposed at spaces between each of plural spaced conveying belts of the conveyer, the level guides including top ends which rise above an upper surface level of the conveying belts while the plate is lifted and rotated by rotating device, and descend to below the upper surface level of the conveying belts when the plate is translated by the conveying belts after the rotation, so that the plate rotates to slide on the level guides.

5 Claims, 4 Drawing Sheets

ROTATABLE APPARATUS FOR TRANSFORMER CORE PLATES

This application is a Continuation of U.S. patent application Ser. No. 08/154,026, filed Nov. 18, 1993 under 35 U.S.C. §120 now abandoned.

BACKGROUND OF THE INVENTION

This invention relates to automatic laminating apparatus for assembling transformer cores, and, more particularly, it relates to an apparatus for rotatably orienting magnetic steel plates on a horizontal feed conveyer.

Transformer cores are constructed by laminating magnetic steel plates in a frame configuration. In automatic laminating devices used to form transformer cores, a feed conveyor is provided for supplying individual plates to a laminating station at which the plates are stacked to form portions of the frame like core. In order to form the frame configuration, the magnetic steel plates are oriented in angular positions on the feed conveyor so that upon arrival at the laminating station, the individual plates are oriented properly for the portion of the frame-like core in which they are to be laminated. As the result, a rotatable apparatus is used in association with the feed conveyor.

FIG. 8 shows a plan view of a conventional rotating apparatus for plates used in a transformer core laminating apparatus. A plate 2, as represented by the dashed line rectangle, is placed on the upper run of endless belts 1 of a belt-conveyer to be conveyed horizontally in the left-right direction of FIG. 8. A rotatable lifting support 3, shown in solid lines, is disposed over the plate 2 and is capable of rotating the plate 2 to a predetermined angular orientation as shown by the dot/dash line 2A while lifting the plate 2.

FIG. 9 shows a side elevation as seen in the direction of an arrow P in FIG. 8. The rotatable lifting support 3, carried at the bottom of a vertical supporting shaft 5, is provided with a plurality of suction devices 4 made of rubber material. Plates like the plate 2 (not shown in FIG. 9) are placed between the suction devices 4 and the conveying belts 1. The suction devices 4 are connected to a suction source (not shown) by an air conduit (also not shown) provided in the rotatable support 3 and the supporting shaft 5 so as to lift an object on the conveying belts 1 when the suction devices are in fluid communication with the suction source.

FIG. 10 is an end elevation as seen in the direction of an arrow Q in FIG. 8. As in the side elevation of FIG. 9, the suction devices 4 are provided across the full length of the undersurface of the rotatable support 3. Also the combined width of the plurality of parallel conveyer belts 1 is at least equal to the length of the support 3. To accommodate magnetic steel plates used in large capacity transformers, this dimension may be as large as 5 meters. Since such a long plate is conveyed and rotated, the width of an adequate belt-conveyer is conventionally provided by the separated and spaced conveying belts 1.

FIG. 11 shows a end view of the conventional apparatus of FIG. 10 in a condition when the plate 2 is being lifted. The plate 2 is lifted in a horizontal orientation by the suction devices 4. In this state, the rotatable support 3 rotates and turns the plate 2 to a predetermined angular orientation. Then the rotatable support 3 descends to return to the initial position as shown in FIG. 10.

However, the required large size of the rotatable support in the above described conventional apparatus presents a problem. As shown in FIG. 11, in order to lift the plate in a horizontal orientation, the plurality of suction devices 4 must be positioned across the whole surface of the plate to be lifted. The rotatable support 3 is, therefore, made larger than the area of the plate 2 so as to provide an adequate number of suction devices 4 to effect a uniform lifting force over the complete area of the largest plate to be used.

If the rotatable support of the conventional apparatus is made smaller, such as represented by the support 30 in FIG. 12, in the case where the plate 2 is a very thin plate of magnetic steel, both edges of the plate 2, being unsupported, hang down as shown. If the rotatable support 30 rotates in this state, both edges of the plate 2 rub against the conveying belts 1, so that the plate 2 is bent or the conveying belts 1 are damaged.

Because of the above problems, the conventional apparatus usually employs a large rotatable support 3. As mentioned above, some large capacity transformers include magnetic plates having a length as much as 5 meters and further, a width as much as 1 meter. Since the plate should be lifted over the whole surface thereof, the rotatable support requires a very large area to provide the suction devices. However, when the rotatable support 3 is of such a large size, a rotating inertia increases and further, the overall weight of the apparatus is increased greatly.

SUMMARY OF THE INVENTION

The present invention has been made in view of the above circumstances and has, as an object, to provide a system of level guides to support the edges of a conveyed plate while rotating, so that the size of a rotatable support is minimized.

To achieve the objects and in accordance with the purpose of the invention, as embodied broadly described herein, the rotating apparatus for transformer core plates comprises a rotatable support for suction lifting of a plate on conveying belts to rotate the plate to a predetermined direction, and a plurality of level guides disposed between the conveying belts. The top ends of the level guides rise above the upper surface level of conveying belts while the plate is lifted and rotated, and descend below the upper surface level of conveying belts while the plate is translated by the conveying belts. Preferably, the top ends of the level guides are made round and treated by a chromium plating, or the top ends of the level guides are provided with free-bearing rotation in all directions.

In accordance with the preferred embodiments of the invention, a plurality of such level guides are disposed at opposite sides of each conveying belt. As a result, the edges of the rotating plate are lifted by the level guides and regardless of how much smaller than the area of plate the rotatable support may be, the plate does not contact the conveying belts. Thus, the plate is rotated without deflection from a completely horizontal orientation.

Because the top ends of the level guides are made round and treated by chromium plating, or provided with universal free-bearings rotatable in all directions, the coefficient of friction of the tops of the level guides is reduced and the frictional resistance to rotation of the plate is reduced.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 1:
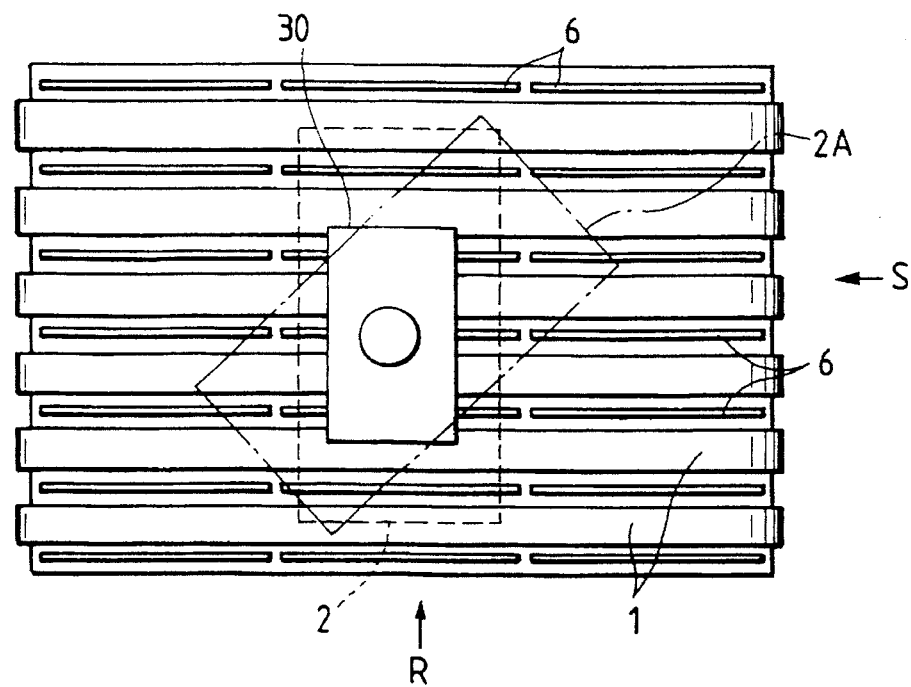
FIG. 1 is a plan view of a rotating apparatus for plates in accordance with one embodiment of the invention.
Figure 8:
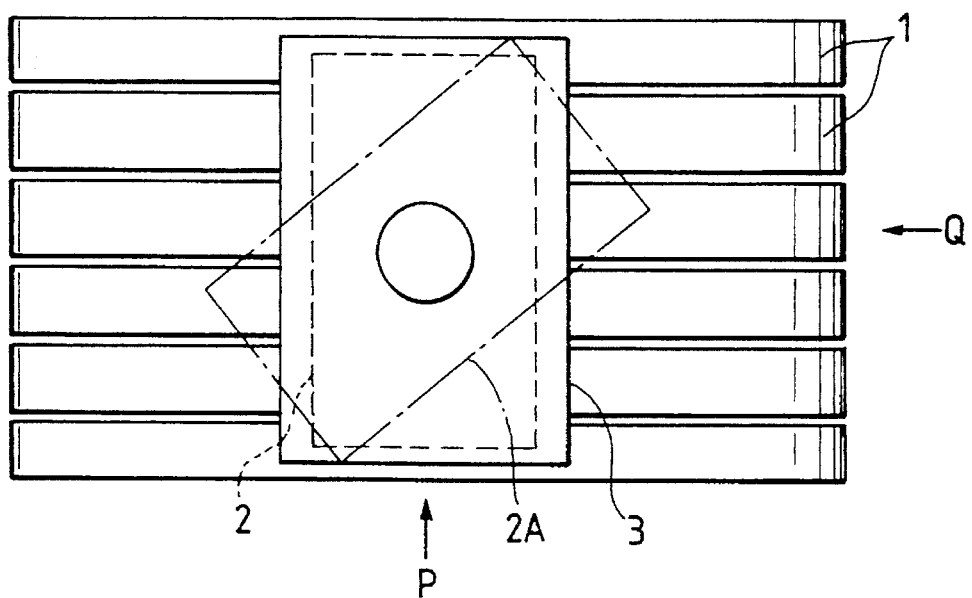
FIG. 8 is a plan view of a conventional rotating apparatus for plates.
Figure 9:
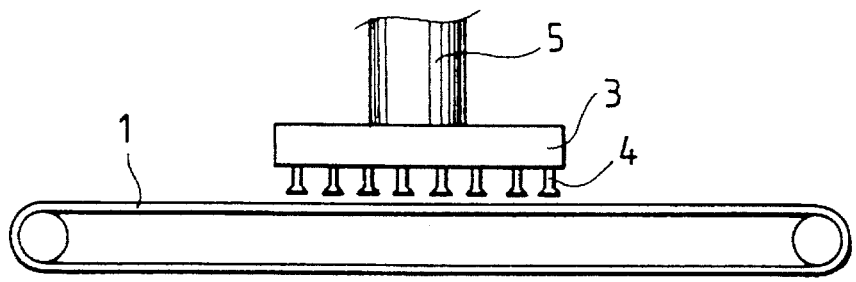
FIG. 9 is a side elevation as seen in a direction P shown in FIG. 8.
Figure 10:
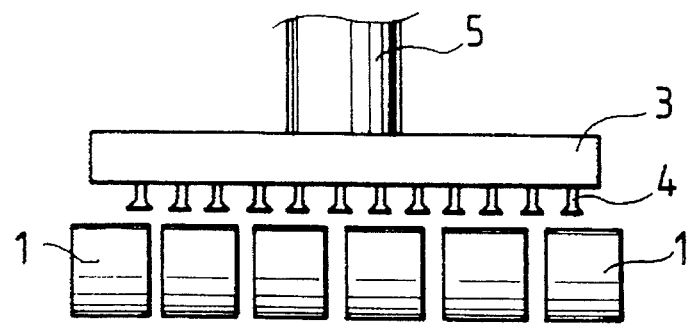
FIG. 10 is an end elevation as seen in a direction Q shown in FIG. 8.
Figure 11:
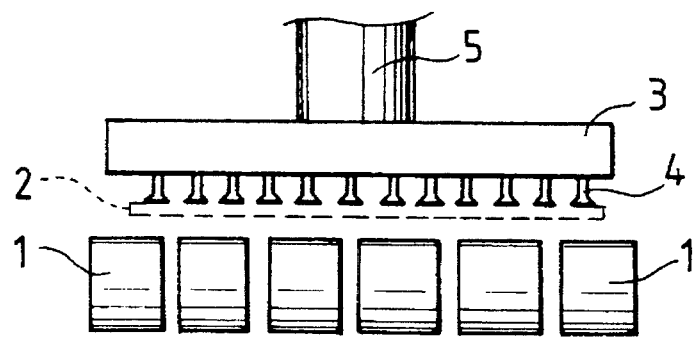
FIG. 11 is a side view of the apparatus lifting the plate shown in FIG. 10.
Figure 12:
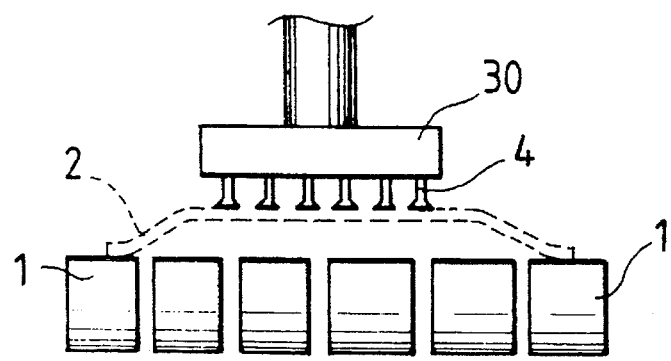
FIG. 12 is a side view of the apparatus in a state when a rotatable support having smaller area than the plate lifts the plate from the conveying belts.

Reference will now be made in detail to the invention and the present preferred embodiments of the invention, examples of which are illustrated in the accompanying drawings. As shown in FIG. 1, an embodiment in accordance with the invention includes a plurality of level guides 6 disposed at opposite sides of each conveying belt 1. A rotatable support 30, shown in solid lines, has smaller area than a plate 2 shown in dashed lines and placed on the upper surface of the conveying belts 1. Elements corresponding to the conventional apparatus shown in FIG. 8 are designated by the same reference numerals.

Figure 2:
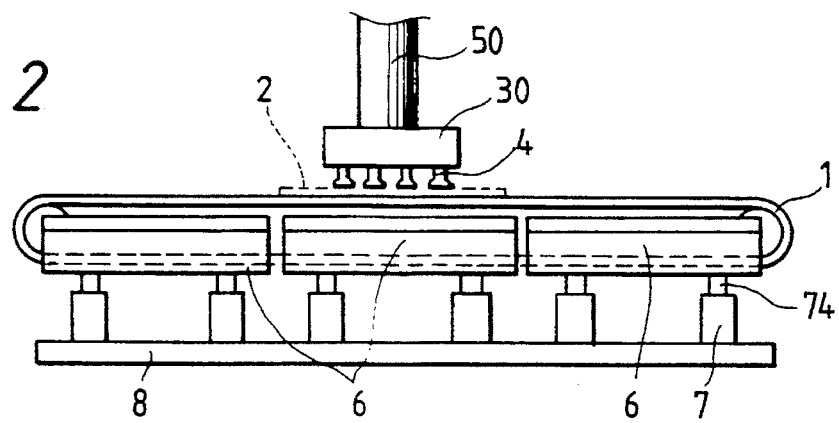
FIG. 2 is a side elevation as seen in a direction R in FIG. 1.
Figure 3:
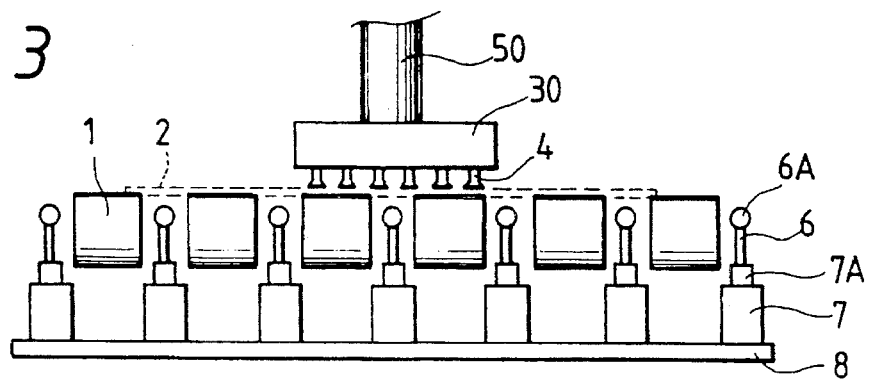
FIG. 3 is an end elevation as seen in a direction S in FIG. 1.

As shown in FIG. 2, the level guides 6 are formed as rails and are fixed on moveable rods 7A reciprocable in fluid actuated cylinders 7 on base 8. The level guides 6 are provided with bars 6A, as shown in FIG. 3, and which are treated by chromium plating. The cylinders 7 drive the moveable rods 7A so as to elevate and lower the rods 7A, so that the level guides 6 can move up and down.

Figure 4:
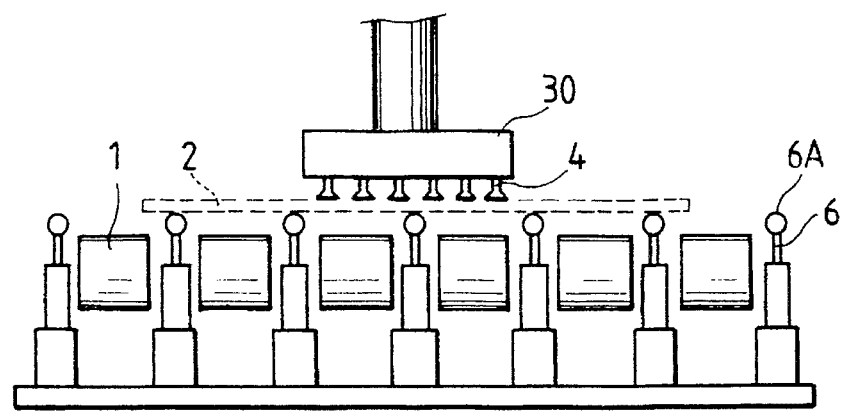
FIG. 4 is a side view of the apparatus while lifting the plate shown in FIG. 3.

FIG. 4 illustrates the apparatus while lifting the plate 2 shown in FIG. 3. As the suction devices 4 operate to lift the plate 2, the level guides 6 rise to push up the edges of plate 2. Since the level guides 6 are disposed over the whole area of the conveying belts 1, the plate 2 is kept horizontal and essentially planar. When the rotatable support 30 rotates in this state, the plate 2 slides on the bars 6A of the level guides 6 so as not to contact to the conveying belts 1. Accordingly, the size of rotatable support 30 may be smaller than the width of plate 2, and it is enough for the rotatable support 30 to provide a force only for gripping by suction and rotating the plate 2. Further since bars 6A are rounded at the top thereof and treated by chromium plating, the frictional resistance is to plate rotation is reduced. Still further, since the load applied to the rotatable support, when rotating, is reduced, a driving device for rotating the rotatable support may be made small.

Figure 5:
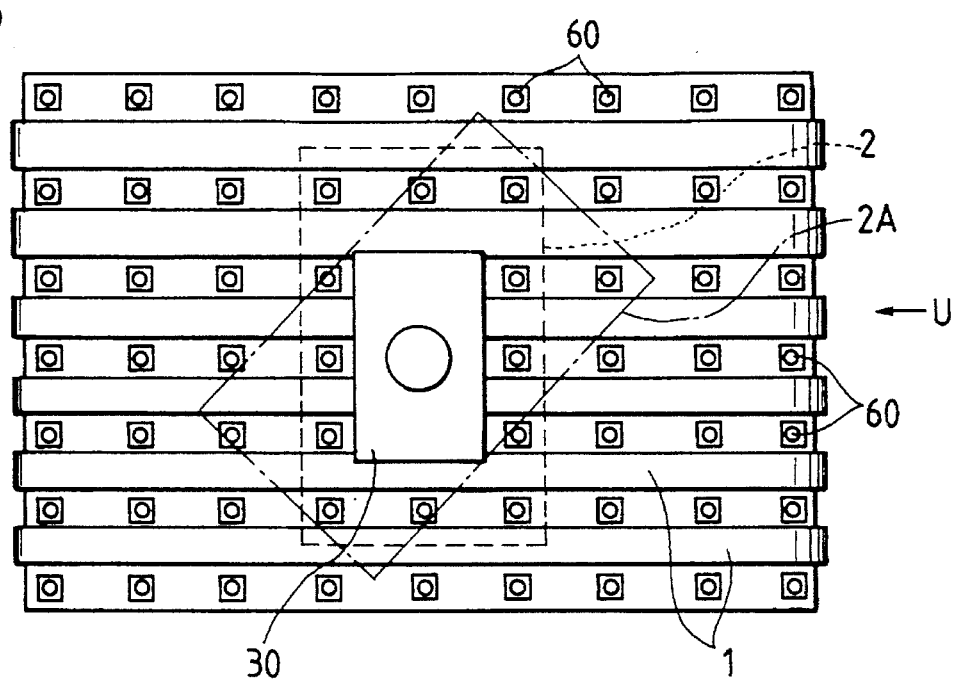
FIG. 5 is a plan view of a rotating apparatus for plates in accordance with another embodiment of the invention.

In FIG. 5, a plate rotating apparatus of another embodiment in accordance with the invention is shown. As in the embodiment of FIG. 1, a plurality of moveable level guides 60 are disposed at the sides of each conveying belt 1.

Figure 6:
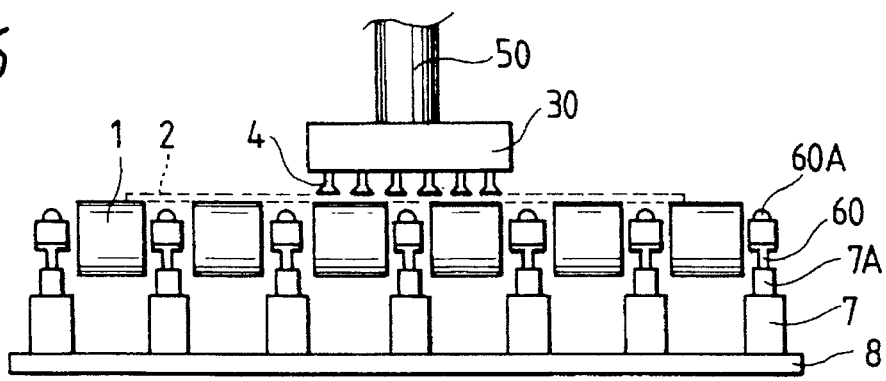
FIG. 6 is an end elevation as seen in a direction U in FIG. 5.

FIG. 6 is a view as seen in the direction U in FIG. 5. The level guides 60 are provided with freely rotatable spherical bearings 60A in supports fixed on the moveable rods 7A of the cylinders 7, respectively. The bearings 60A are rotatable steel balls, respectively, the upper portion of which are exposed. Accordingly, the plate 2 contacts with the upper portion of the bearings 60A, so that the coefficient of friction, resisting movement of a plate 2, is reduced in all directions in a horizontal plane.

Figure 7:
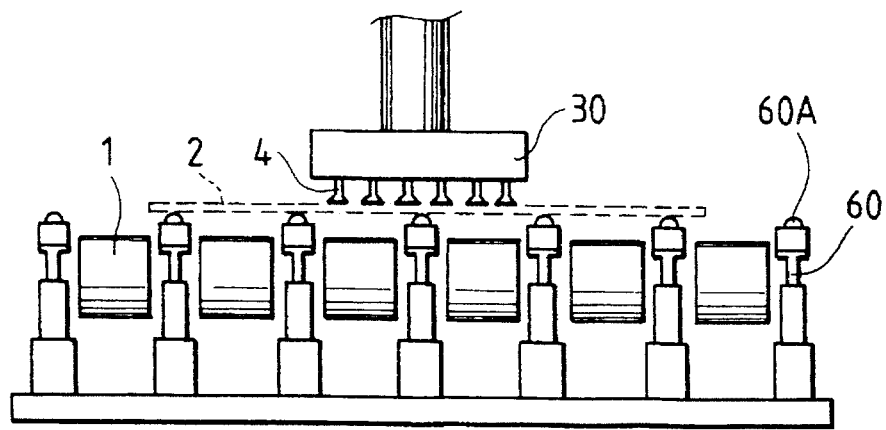
FIG. 7 is a side view of the apparatus lifting the plate shown in FIG. 6.

As shown in FIG. 7, when suction devices 4 lift the plate 2, the level guides 60 rise to push up the edges of plate 2. In a manner similar to the embodiment shown in FIG. 4, the whole area of the plate 2 is maintained in a horizontal plane. Since the coefficient of friction of the bearings 60A is kept to a low level, the load applied to rotate the rotatable support 30 is reduced even more than in the construction shown in FIG. 4. Further the rotatable support 30 of FIG. 6 and the rotation driving device therefor may be made small.

Additionally, as still another example, instead of the free-bearings 60A in FIG. 6, the level guides may be provided with a plurality of steel balls treated by chromium plating which is exposed at the upper round portion thereof. The steel balls may be fixed against rotation. In that case, since the coefficient of friction of the ball surface is kept to a low level, the load applied to the rotatable support 30, when rotating, is reduced greatly in a manner similar to the apparatus shown in FIG. 1.

As thus described, the apparatus according to a preferred embodiment of the invention provides a plurality of level guides at the sides of each conveying belt, wherein the top ends of level guides rise above the upper surface level of conveying belts while the plate is lifted and rotated, and further, the top ends of level guides descend to a level lower than the upper surface level of conveying belts while the plate is translated on the conveying belts. Since the edges of the plate are pushed up by the level guides while the rotatable support lifts the plate, however much smaller than the plate area the rotatable support may be, the plates are kept in the horizontal plane thereof. Accordingly, in comparison to the conventional device, the rotatable support in the apparatus of the present invention can be made as small as ½ to ¼ of the size in the conventional apparatus.

Still further in the above construction, the tops of the level guides are made round toward the upper direction and are treated by chromium plating. Alternatively, the tops of the level guides may be provided with bearings rotatable in all directions. As a result of the construction of the level guides, the load applied to the rotatable support while rotating is reduced, and a rotation driving device for the rotatable support is made small, so that the weight of the apparatus is decreased and the cost for the apparatus is reduced.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A rotating apparatus for orienting transformer core plates on a conveyer for feeding the plates to a laminating device, said apparatus comprising:

a plurality of parallel conveying belts included in said conveyer and having spaces therebetween, said conveyer having a vertically fixed upper surface level and conveying a plate to a predetermined horizontal position;

rotating means located above said conveyer at said predetermined position for lifting said plate from said upper surface level and rotating said plate through a predetermined angle of rotation; and a plurality of level guides disposed in the spaces between each of said conveying belts, the level guides including top ends having lower friction resistance than said conveying belts, respectively; and means for elevating said top ends of said level guides above said upper surface level of said conveying belts, to maintain the plate in a substantially flat configuration while said plate is lifted and rotated by the rotating means, and for lowering said top ends from above said upper surface level to below said upper surface level of said conveying belts when said plate is placed on said conveying belts after the rotation.

2. An apparatus according to claim 1, wherein said rotating means includes a plurality of suction devices for retaining said plate to said rotating means.

3. An apparatus according to claim 2, wherein said rotating means occupies a smaller horizontal area than said plate.

4. An apparatus according to claim 1, wherein said top ends of said level guides are round and include chromium plating.

5. An apparatus according to claim 1, wherein said top ends of said level guides include free-bearings, respectively, the free-bearings being rotatable in all directions.

* * * * *